J. HYDE.
PIPE-JOINT.
No. 170,373. Patented Nov. 23, 1875.
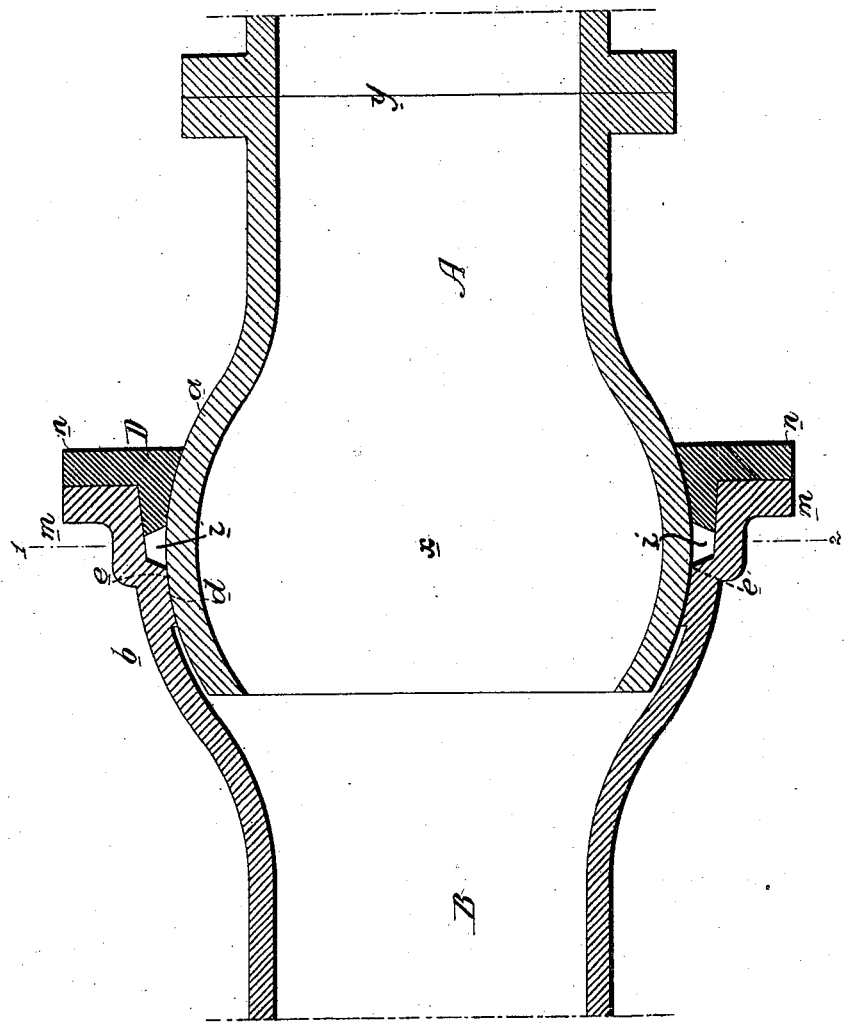
Witnesses,
Edward H. Eastleft
Harry Smith
Joseph Hyde
by his Attorneys,

UNITED STATES PATENT OFFICE.

JOSEPH HYDE, OF WILMINGTON, DELAWARE.

IMPROVEMENT IN PIPE-JOINTS.

Specification forming part of Letters Patent No. 170,373, dated November 23, 1875; application filed September 10, 1875.

*To all whom it may concern:*

Be it known that I, JOSEPH HYDE, of Wilmington, Delaware, have invented an Improved Pipe-Joint, of which the following is a specification:

My invention relates to that class of pipe-joints in which the spherical spigot end of one pipe is combined with the spherical faucet end of an adjoining pipe, so that several pipes thus united by ball-and-socket joints wi l accommodate themselves to the uneven bed of a river or creek in which they may be laid; and the object of my invention is to so construct a joint of this class that it will be perfectly tight, and at the same time permit the disconnection of the pipes. This object I attain in the manner which I will now proceed to describe, reference being had to the accompanying drawing, which represents a section of my improved joint.

A represents a portion of one pipe, and B a portion of the adjoining pipe. The end of the pipe A is made in the form of a section of a sphere, of which $x$ is the center, and the socket $b$ of the pipe B has an internal bearing, $d$, adapted to the spherical end of the pipe A, this bearing extending to the line $e\ e$, which is within a short distance from a line, 1 2, drawn through the center $x$ of the sphere, at right angles to the central line of the pipe. Beyond the edge $e$ of this bearing the socket $b$ of the pipe B is enlarged for the reception of the follower D, which is adapted to the spherical end $a$ of the pipe A, the outer edge of this follower, when the latter is in place, being a short distance from the above-mentioned line 1 2, so that there shall be an annular space between the edge of the bearing $d$ in the socket of the pipe B and the edge of the follower. The socket $b$ is provided with a flange, $m$, and the follower D with a like flange, $n$, the two flanges being secured by bolts, on screwing the nuts of which tight the metallic or other packing contained in the annular recess must necessarily be compressed tightly against the spherical end $a$ of the pipe A, and a perfectly tight joint must be the result.

The pipes may at any time be disconnected after first removing the follower.

In order to permit the follower to slip over the pipe A, the latter may be made in two pieces, joined together at $y$, as shown, or the follower itself may be halved, in which case the pipe A is made in one piece.

I claim as my invention—

The within-described pipe-joint, consisting of the spherical end $a$ of the pipe A, and the bearing $d$ in the socket of the pipe B, in combination with the follower D, adapted to the socket $b$, and the intervening packing-space $i$ between the said follower and bearing $e$, all substantially as set forth.

In testimony whereof I have signed my name to this specification in the presence of two subscribing witnesses.

JOSEPH HYDE.

Witnesses:
    EDWARD H. ECKFELDT,
    HARRY SMITH.